June 9, 1959
H. W. ANDERSON
2,889,638
BOOK TYPE MAP STRUCTURE
Filed Aug. 11, 1955
3 Sheets-Sheet 1
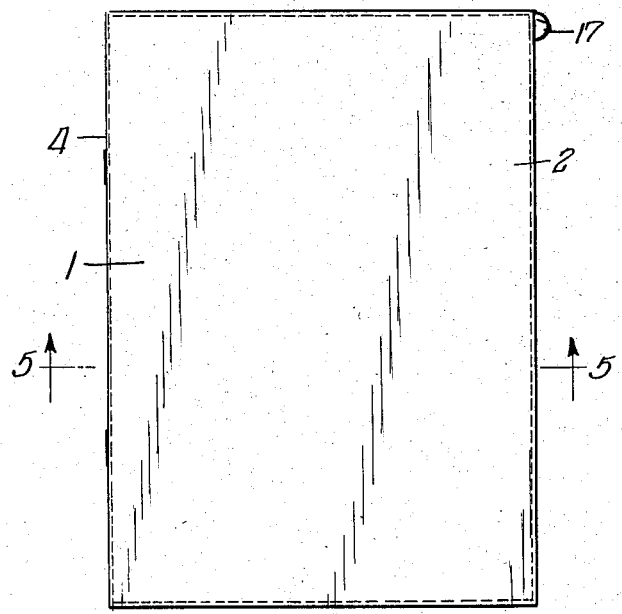
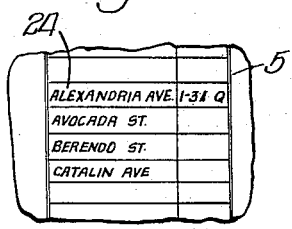
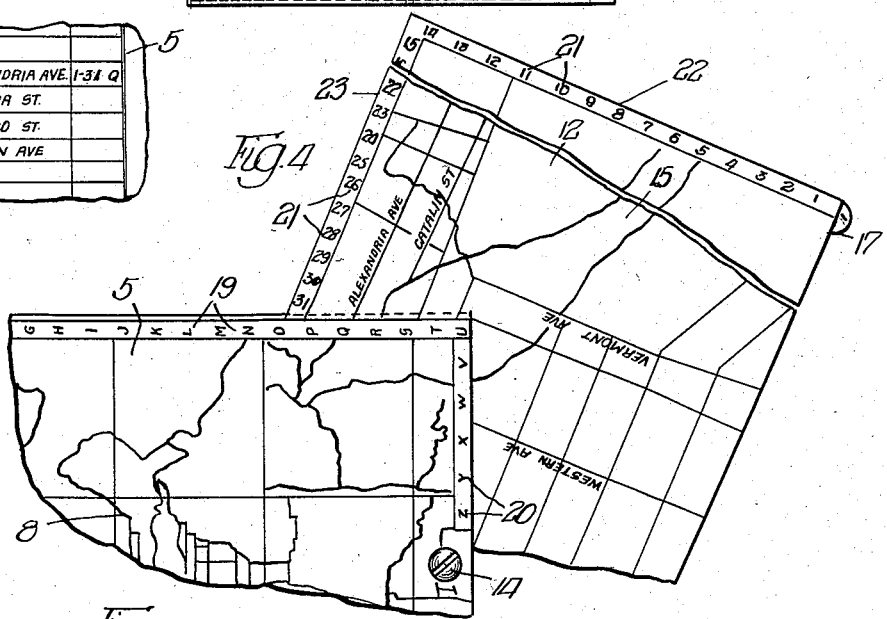
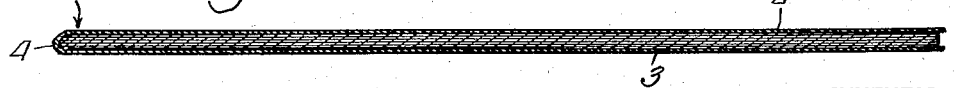
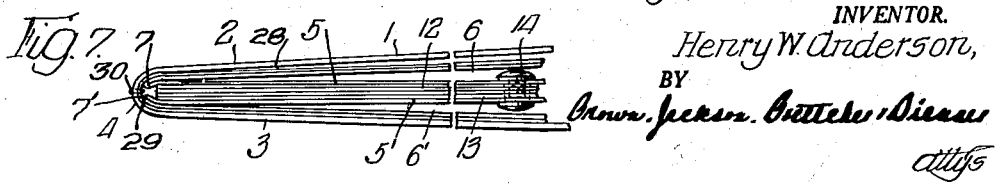
INVENTOR.
Henry W. Anderson,
BY
ATTYS June 9, 1959 H. W. ANDERSON 2,889,638
BOOK TYPE MAP STRUCTURE
Filed Aug. 11, 1955 3 Sheets-Sheet 2
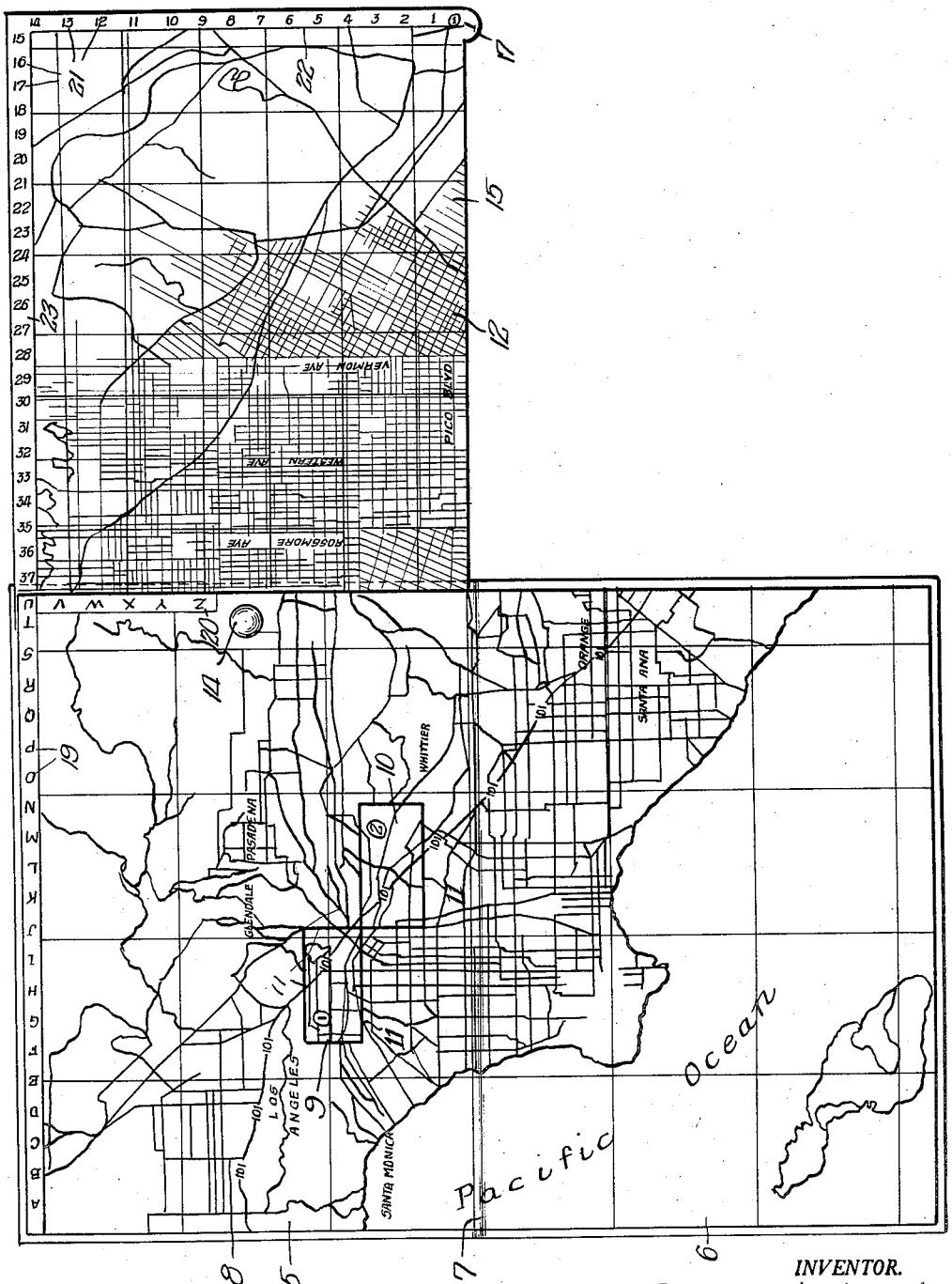
INVENTOR.
Henry W. Anderson,
BY
Brown, Jackson, Boettcher & Dienner
Attys.

June 9, 1959  H. W. ANDERSON  2,889,638
BOOK TYPE MAP STRUCTURE
Filed Aug. 11, 1955  3 Sheets-Sheet 3

INVENTOR.
Henry W. Anderson,
BY
Brown, Jackson, Boettcher & Dienner
Attys.

United States Patent Office 2,889,638
Patented June 9, 1959

2,889,638

BOOK TYPE MAP STRUCTURE

Henry W. Anderson, Chicago, Ill.

Application August 11, 1955, Serial No. 527,696

8 Claims. (Cl. 35—42)

This invention relates, in general, to maps, and has particular relation to an improved form of map embodying one or more overall or key maps for a given area and detail maps covering in greater detail different sections or portions of the area covered by the key map.

Heretofore in the art, overall or key maps and detail maps of the aforementioned character have been provided on different pages or leaves bound together into booklet form. The key maps of these prior maps commonly appears on what constitutes, for example, one page or complementary page parts of the booklet, and the detail maps are on other pages of the booklet.

These prior schemes have the objection that they do not permit quick and easy use, by a motorist, for example, while traveling. It is practically impossible to view the overall or key map and any of the detail maps at the same time. Instead, the motorist or other user of the map turns first to the key map and endeavors to follow the same until he gets into or near the desired section toward which he is traveling. For guidance in the desired section, he must then turn to a different page provided with the desired detail map. As a result, he then loses his view of the key map and the relation between the details of the selected section and the other parts of the key map.

One of the main objects of the present invention is to provide an improved form of map embodying one or more overall or key maps for a given area and detail maps covering in greater detail different sections or portions of the area covered by the key map and in which the key map and the detail maps may be viewed at the same time and on substantially the same eye level.

Another object is to provide a map of the character described in which the key map appears on one page or complementary page parts of the booklet whereas the detail maps are positioned on pages normally concealed within the booklet and adapted to be selectively withdrawn to position exposed beyond the edge of the key map so that the key map and the selected detail map may be viewed simultaneously and on substantially the same eye level.

Another, and more specific object is to pivot the detail map or a plurality of such maps in the booklet for withdrawal selectively to exposed positions beyond the edge of the key map by pivotal movement about the pivot.

Another object is to utilize the pivotal action of the detail maps for the purpose of permitting simultaneous viewing of the key map and the selected detail map and for the additional purpose of finding desired locations on the detail map by means of coacting lists of indicia along the edges of the key and detail maps.

Another object is to provide an improved booklet form of map of the character described in which there are two or more key maps with one or more detail map bearing pages pivoted between the key map pages and carrying different detail maps on opposite sides thereof, and with the pivot so arranged that the detail map page may be swung from one edge of one key map and from the opposite edge of the other key map to permit one detail map to be viewed simultaneously with one key map and the other detail map on the opposite side of the same page to be viewed simultaneously with the other key map.

Further objects and advantages of the invention will appear from the following detailed description, taken in connection with the accompanying drawings in which:

Figure 1 is a front elevational view of one form of map booklet embodying the present invention with the booklet folded to closed position and the detail map bearing leaves in concealed positions;

Figure 2 shows the booklet opened to one of the key maps and one of the detail map bearing leaves swung to position exposed beyond the edge of the key map;

Figure 4 is a fragmentary view showing how the cooperating indicia on the edges of the leaves are used to find a location on the detail map;

Figure 5 is a detail sectional view taken on the line 5—5 of Figure 1;

Figure 6 is a fragmentary view of the back of the page bearing one of the key maps or part thereof, to show one of the listings of streets or the like, and the indexing of same relative to the locating indicia on the map bearing pages; and Figure 7 is a bottom edge view of the map booklet on enlarged scale and partially broken away.

Figure 3:
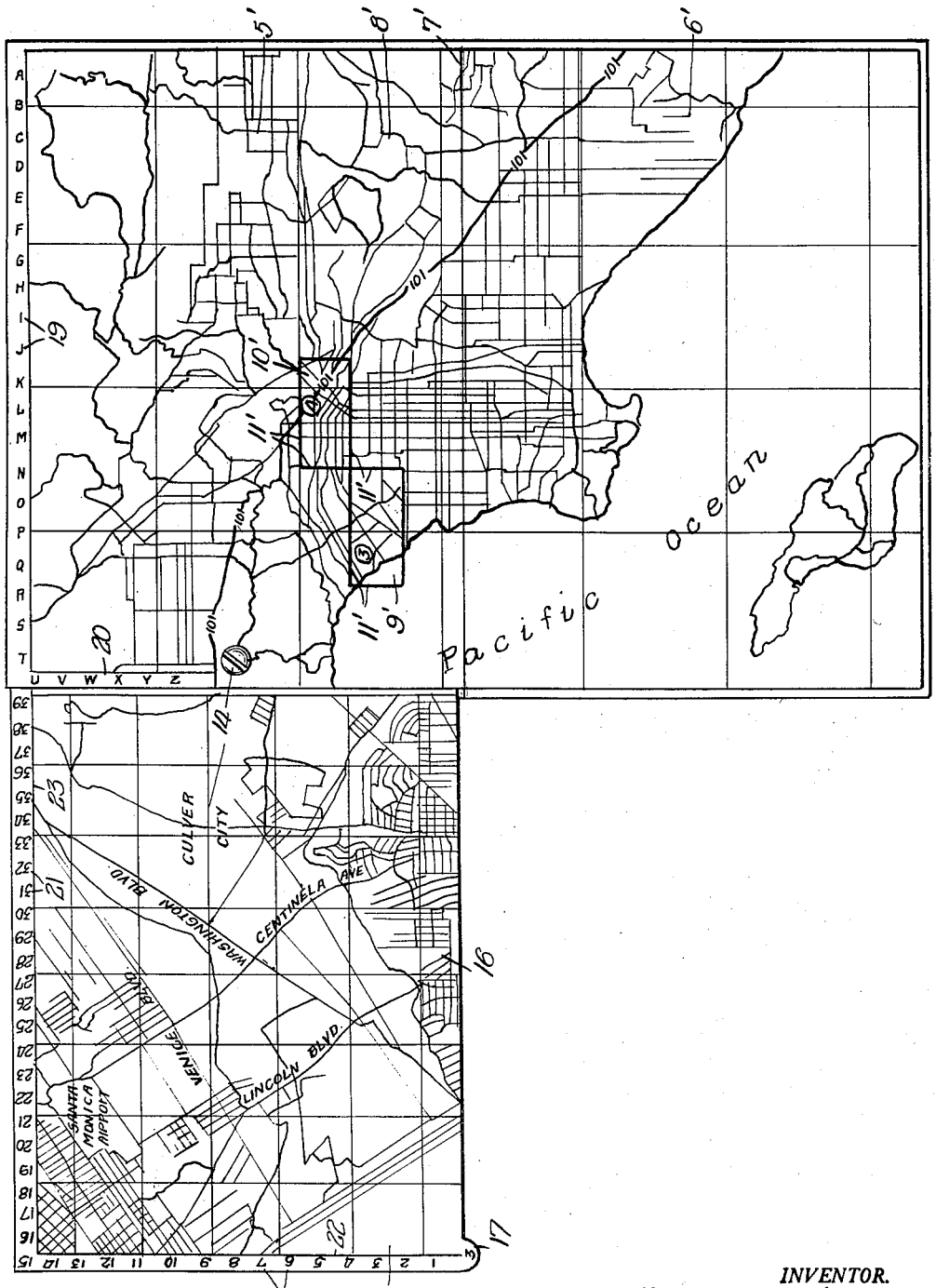
Figure 3 shows the booklet opened to the other key map and the detail map bearing leaf swung to position exposed beyond the edge of the other key map.

Referring now to the drawings, the map selected for illustration has a cover 1 of generally U-shaped form having a front side 2 and a back side 3 folded or joined at 4 as shown in Figure 5.

Within the front of the cover 1, there is a page or complementary page parts 5 and 6 which fold along the line of fold 7 when the booklet is closed. The page or complementary page parts 5 and 6 bear a key or overall map 8 shown, for example, as a map covering Los Angeles, California and surrounding areas. This map preferably shows all highways, National Parks and Monuments, cities and principal towns with route numbers, and, if desired, mileage figures and other helpful data. Detail is minimized to permit quick and easy use of the map while traveling.

The key map 8 has one or more detail areas 9 and 10 marked thereon, for example, by grid lines 11 or otherwise as desired. For Los Angeles, California and surrounding areas there preferably will be a relatively large number of detail areas marked on the key map 8.

Within the back of the cover 1 there is a page or complementary page parts 5' and 6' which fold along the line of fold 7' when the booklet is closed. The page or complementary page parts 5' and 6' bear a key or overall map 8', similar to the key map 8, and therefore also covering Los Angeles, California and surrounding areas in the particular map selected for illustration. The key map 8', however, is reversed with respect to the key map 8.

The back sides of the page 5 and 5' may be glued or otherwise secured to the inner surfaces of the front and back sides 2 and 3 of the cover 1. If desired, there may be an intermediate leaf 28 folded at 29 (Figure 7) and stapled at the fold to the fold 4 of the cover 1 by a staple 30. In this case, one part of the leaf 28 may be glued or otherwise secured to the outer side of the page part 6. The other part of the leaf 28 may be similarly interposed between the inner surface of the back side 3 of the cover 1 and the outer side of the page part 6' and glued or secured to the outer side of the page part 6'.

Similar to the key map 8, the key map 8' has one or more detail areas 9' and 10' marked thereon, for example, by grid lines 11′ or otherwise as desired. The detail areas 9′ and 10′ are for different areas than the detail areas 9 and 10 and where the key map 8 has a larger number of detail areas the key map 8′ also preferably has a similar number of detail areas.

Detail map bearing leaves 12 and 13 are pivoted between the page parts 5 and 5′ upon a pivot 14 which extends through the page parts 5 and 5′ and leaves 12 and 13 and is headed at its opposite ends. The pivot 14 may be of separable or detachable form to permit removal and replacement, or insertion of additional leaves or removal or replacement of the leaves. The key maps 8 and 8′ being reversed it will be apparent that the pivot 14 is at opposite sides of these maps when open to view, but this may vary. There is preferably a detail map bearing leaf for each detail area 9 and 10 on the key map 8 and therefore where there are additional detail areas on the key map 8 there will be a corresponding additional number of detail map bearing leaves.

Each detail map bearing leaf 12 and 13 has detail maps 15 and 16 on opposite sides thereof. The detail map 15 on one side shows one of the detail areas 9, 10 marked on the key map 8, of larger size and in greater detail than on the key map 8. The detail map 16 on the opposite side of the leaf shows one of the detail areas 9′, 10′ marked on the key map 8′, of larger size and in greater detail than on the key map 8′.

The leaves 12 and 13 may have tabs 17 with one side of the tab 17 on the leaf 12 bearing, for example, the number 1 or a letter or the like corresponding with the number 1 or letter or the like in one of the detail areas on the key map 8. One side of the tab 17 on the leaf 13 bears the number 2 or a letter or the like corresponding with the number 2 or letter or the like in another detail area on the key map 8. The opposite side of the tab 17 on the leaf 12 bears the number 3 or a letter or the like corresponding with the number 3 or letter or the like in one of the detail areas on the key map 8′. The opposite side of the tab 17 on the leaf 13 bears the number 4 or a letter or the like corresponding with the number 4 or letter or the like in another detail area on the key map 8′.

In the use of the map the motorist or other user uses the key map and endeavors to follow the same until he gets into or near the desired section toward which he is traveling. For example, starting at Orange on the key map 8, if he desires to travel into the detail area 9 marked 1 on the key map, he will follow route 101 until he gets into or near the area 1. Then, grasping the tab 17 on the leaf 12, he will swing the leaf about its pivot 14 to position exposed beyond the edge of the key map as shown in Figure 2. The motorist may then view the detail map 15 and the key map 8 simultaneously, using the detail map 15 for detail guidance to the desired location within the detail area 1 and simultaneously using both the key map 8 and the detail map 15 to keep oriented with respect to the surrounding region. The detail maps preferably have the names of all streets marked thereon (only a few being marked in Figure 2 to simplify the illustration); also highways and/or other data, as desired.

If the motorist desires to travel into the detail area 10 marked 2 on the key map 8, he will follow the key map 8 until he gets into or near the area 2. Then, grasping the tab 17 on the leaf 13, he will swing this leaf about its pivot 14 to position exposed beyond the edge of the key map 8. The motorist may then view the detail map on the leaf 12 and key map 8 simultaneously, using the detail map for detail guidance to the desired location within the detail area 2 and simultaneously using both the key map 8 and the detail map to keep oriented with respect to the surrounding region.

If the motorist desires to travel into one of the detail areas, for example, 3 or 4, on the key map 8′, he merely uses the key map 8′ and endeavors to follow the same until he gets into or near the desired section 3 or 4 on the key map 8′. Then by grasping the tab 17 on the desired leaf 12, 13, he swings such leaf to position exposing the detail map on the opposite side of the leaf 12 or 13 beyond the edge of the key map 8′, as shown in Figure 3. The key map 8′ and desired detail map are thus again adapted to be viewed simultaneously and on substantially the same eye level for detail guidance to the desired location within the desired detail area and at the same time for keeping oriented with respect to the surrounding region.

The provision of the two reversed key maps 8 and 8′ in the same booklet, with their reversed arrangement and the arrangement of the pivot 14, and the arrangement of the detail maps with respect to the key maps, enables the use, as an illustration, of only eighteen detail map bearing leaves with detail maps on their opposite sides for covering thirty-six detail areas on the key maps. This reduces the cost and makes for compactness of the booklet form of map according to the present invention and the map according to this invention permits quick and easy use while traveling.

For the purpose of facilitating the finding of a desired detail location on the detail maps on the leaves 12 and 13 first lists of indicia 18 shown in the form of letters A through Z extend along the edges 19 and 20 and 19′ and 20′ of the leaves bearing the key maps 8 and 8′. Second lists of indicia 21 in the form of numbers 1 through 39 extend along opposite sides of the edges 22 and 23 of each leaf 12 and 13.

Listings 24 of streets, towns or other points on the detail maps may be provided, for example, on the front of the leaf or page part 5 or elsewhere within the booklet. These listings are preferably in alphabetical order and are followed by index references. For example, and for purposes of illustration, the street Alexandria Ave., is followed by the index reference 1–31–Q in the listings 24. In order to locate Alexandria Ave. on the detail map, the user of the map selects the detail map bearing leaf with the tab marked 1 and swings this leaf about the pivot 14 until the indicia number 31 on the leaf is in register with the indicia bearing edge of the key map 8. Then, by glancing at the detail map (Figure 4) adjacent the indicia letter Q along the edge of the key map 8 the street Alexandria Ave., is quickly and easily located on the detail map 15. The other index references in the listings 24 cover the other streets, towns or points on the other detail maps and provide for similarly locating the same as above described.

The pivoting of the detail map bearing leaves within the booklet thus not only permits viewing the key map and any selected detail maps simultaneously and on substantially the same eye level but provides a compact map which enables locating desired streets or other points on the detail maps quickly and easily. Only the key map and/or detail map which are being used are exposed to view. The other maps are within the booklet and out of the way.

The embodiment of the invention shown in the drawings is for illustrative purposes only and it is to be especially understood that said drawings and the accompanying specification are not to be construed as a definition of the limits or scope of the invention, reference being had to the appended claims for that purpose.

I claim:

1. A book type map comprising, in combination, a key map bearing sheet having an intermediate fold with first and second portions of said sheet on opposite sides of said fold adapted to be folded together and to be opened to position with their inner surfaces in substantially coplanar relation, said inner surfaces bearing a key map of an area substantially as large as the combined areas of the inner surfaces of said first and second portions of said sheet, a plurality of leaves each bearing a detail map on enlarged scale and having an area not substantially greater than the area of one of said first and second portions of said key map bearing sheet, said detail map bearing leaves being pivoted on a common pivot to the back of one of said first and second portions and free of the other portion of said key map bearing sheet, said detail map bearing leaves each having pivotal movement selectively from concealed position in back of the portion of the key map bearing sheet to which they are pivoted to exposed position projecting from the edge of said one portion of said key map bearing sheet to permit simultaneously viewing the key map on the inner surfaces of both said first and second portions of said key map bearing sheet and the projecting detail map, detail areas defining on said key map the detail map areas on said detail map bearing leaves but of smaller size and in less detail, said detail map bearing leaves and the detail areas on said key map having indicia relating the respective detail map bearing leaves with respect to the detail areas on said key map.

2. A book type map comprising, in combination, a pair of key map bearing sheets, each having an intermediate fold with first and second portions of each sheet on opposite sides of said folds adapted to be folded together and to be opened to position with their inner surfaces in substantially coplanar relation, said inner surfaces of each sheet bearing a key map of an area substantially as large as the combined areas of the inner surfaces of said first and second portions of the related sheet, a plurality of leaves each bearing detail maps on opposite sides thereof and each having an area not substantially greater than the area of one of said first and second portions of said key map sheets, said detail map bearing leaves being pivoted on a common pivot between the backs of one of the first and second portions and free of the other portions of said key map bearing sheets, said detail map bearing leaves each having pivotal movement selectively from concealed position between one of the first and second portions of said key map bearing sheets to exposed position projecting from the edges of said key map bearing sheets to permit simultaneously viewing the key map on the inner surfaces of both said first and second portions of one of said key map bearing sheets and the detail map on one side of the selected detail map bearing leaf and simultaneously viewing the key map on the inner surfaces of both said first and second portions of the other key map bearing sheet and the detail map on the other side of the selected detail map bearing leaf, detail areas defining on said key maps the detail map areas on said detail map bearing leaves but of smaller size and in less detail, said detail map bearing leaves and the detail areas on said key maps having indicia relating the respective detail map bearing leaves with respect to the detail areas on said key maps.

3. A book type map structure comprising, in combination, a pair of pages joined to be folded together and to be unfolded to open position with their inner surfaces in substantially coplanar relation, said inner surfaces of said pages bearing a key map of an area substantially as large as the combined areas of the inner surfaces of said pages, and at least one leaf of an area not substantially greater than the area of one of said pages and bearing a detail map on enlarged scale and of a detail area constituting only a smaller scale portion of said key map, said detail map bearing leaf being pivoted to the outer side of only one of said pages and free of the other page, said detail map bearing leaf having pivotal movement from concealed position in back of the page to which it is pivoted to exposed position projecting from the edge of said page to permit, when said pages are unfolded to open position and said detail map bearing leaf is pivoted to exposed position, simultaneously viewing the key map on the inner surfaces of said pages and said detail map on said leaf.

4. A book type map structure according to claim 3 wherein there is a first list of indicia extending along at least the edge of the page to which the detail map bearing leaf is pivoted and from which said leaf is projected by pivotal movement thereof, a second list of indicia disposed along at least one edge of said leaf, said second list of indicia being disposed as to be selectively placed in register with said edge of said page by pivotal movement of said leaf whereby a location is found on said detail map by the indexed relation thereby obtained between the indicia on the leaf which is in register with the edge of said page and the indicia of said first list of indicia.

5. A book type map structure comprising, in combination, first and second pairs of pages each pair being joined to be folded together and to be unfolded to open position with their inner surfaces in substantially coplanar relation, said inner surfaces of each pair of pages bearing a key map of an area substantially as large as the combined areas of the inner surfaces of the related pair of pages, and at least one leaf of an area not substantially greater than the area of one of said pages and bearing detail maps on opposite sides thereof on enlarged scale of detail areas constituting only smaller scale portions of said key maps, said detail map bearing leaf being pivoted between and to the backs of the inner pages and free of the outer pages of said first and second pairs of pages, said detail map bearing leaf having pivotal movement from concealed position between said inner pages to exposed position projecting from the edges of said inner pages to permit, when said pages are unfolded to open position and said detail map bearing leaf is pivoted to exposed position, simultaneously viewing the key map on the inner surfaces of one pair of pages and the detail map on one side of said leaf and the key map on the inner surfaces of the other pair of pages and the detail map on the other side of said leaf.

6. A book type map structure according to claim 5 wherein one key map has a detail area marked thereon and defining the detail map area on one side of said detail map bearing leaf and the other key map has a detail area marked thereon and defining the detail map on the other side of said detail map bearing leaf, the detail map areas defined on said key maps constituting only portions of said key maps and being of smaller size and in less detail than the detail map areas on opposite sides of said detail map bearing leaf.

7. A book type map comprising, in combination, a key map bearing sheet having an intermediate fold with first and second portions of said sheet on the opposite sides of said fold adapted to be folded together and to be opened to position with their inner surfaces in substantially coplanar relation, said inner surfaces bearing a key map of an area substantially as large as the combined areas of the inner surfaces of said first and second portions of said sheet, and at least one leaf bearing a detail map on enlarged scale and having an area not substantially greater than the area of one of said first and second portions of said key map bearing sheet, said detail map bearing leaf being pivoted to the back of one of said first and second portions and free of the other portion of said key map bearing sheet, said detail map bearing leaf having pivotal movement from concealed position in back of the portion of the key map bearing sheet to which it is pivoted to exposed position projecting from the edge of said one portion of said key map bearing sheet to permit simultaneously viewing the key map on the inner surfaces of both said first and second portions of said key map bearing sheet and said detail map, said key map having a detail area defining thereon the detail map area on said detail map bearing leaf, but of smaller size and in less detail, said detail map bearing leaf and the detail area on said key map having indicia relating said detail map bearing leaf with respect to said detail area on said key map.

8. A book type map comprising, in combination, a pair of key map bearing sheets each having an intermediate fold with first and second portions of each sheet on opposite sides of said folds adapted to be folded together and to be opened to position with their inner surfaces in substantially coplanar relation, said inner surfaces of each sheet bearing a key map of an area substantially as large as the combined areas of the inner surfaces of said first and second portions of the related sheet, and at least one leaf bearing detail maps on opposite sides thereof and having an area not substantially greater than the area of one of said first and second portions of said key map bearing sheets, said detail map bearing leaf being pivoted between the backs of one of the first and second portions and free of the other portions of said key map bearing sheets, said detail map bearing leaf having pivotal movement from a concealed position between one of the first and second portions of said key map bearing sheets to exposed position projecting from the edges thereof to permit simultaneously viewing the key map on the inner surfaces of both said first and second portions of one of said key map bearing sheets and the detail map on one side of said detail map bearing leaf and simultaneously viewing the key map on the inner surfaces of both said first and second portions of the other key map bearing sheet and the detail map on the other side of said detail map bearing leaf, one key map having a detail area defining thereon the detail map area on one side of said detail map bearing leaf and the other key map having a detail area defining thereon the detail map on the other side of said detail map bearing leaf, the detail map areas defined on said key maps being of smaller size and in less detail than the detail map areas on opposite sides of said detail map bearing leaf, said detail map bearing leaves having indicia on opposite sides thereof related to indicia for the detail areas defined on said key maps for relating the detail maps on opposite sides of said detail map bearing leaf with respect to the detail areas on said key maps.

References Cited in the file of this patent

UNITED STATES PATENTS

| | | |
|---|---|---|
| 1,591,865 | Wagner | July 6, 1926 |
| 1,820,115 | Blair | Aug. 25, 1931 |
| 2,693,648 | Anderson | Nov. 9, 1954 |

FOREIGN PATENTS

| | | |
|---|---|---|
| 25,907 | Great Britain | Dec. 1, 1908 |